April 24, 1962 J. W. DYER ETAL 3,030,794
COINCIDENTAL DOOR LOCKING APPARATUS FOR AN AUTOMOBILE
Filed Sept. 25, 1959 4 Sheets-Sheet 1
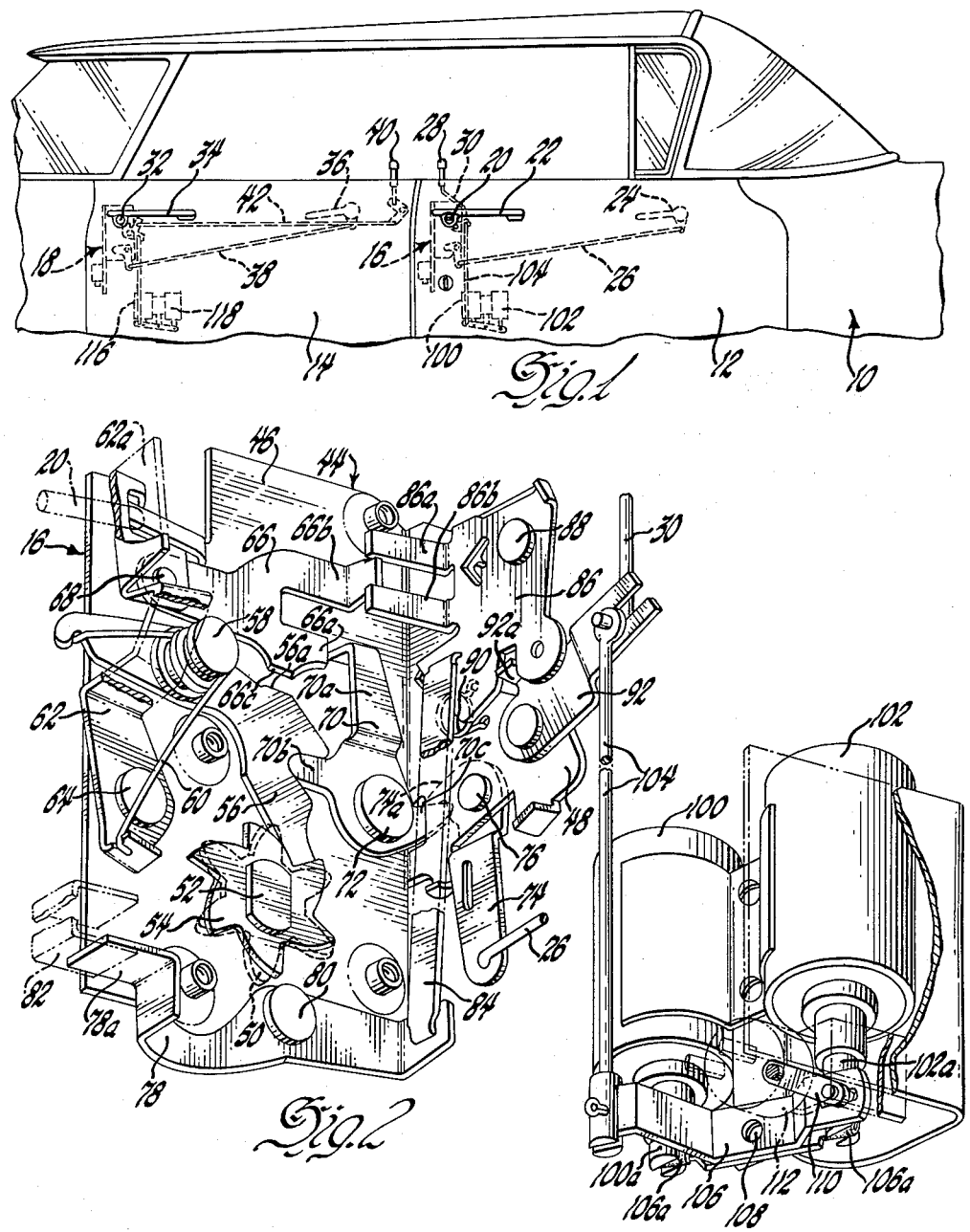
INVENTORS
John W. Dyer, &.
BY Richard L. Sprague
W. S. Pettigrew
ATTORNEY

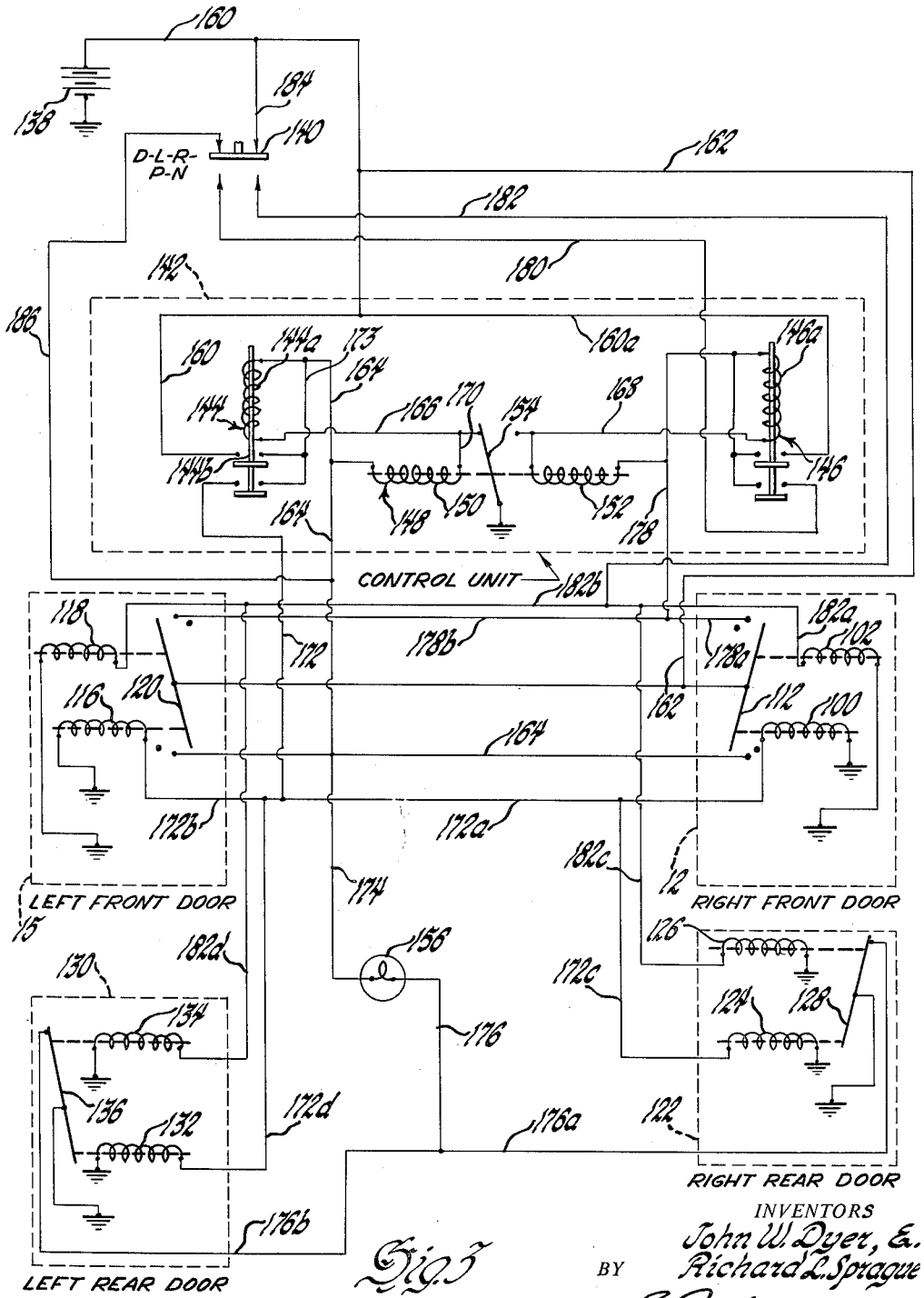

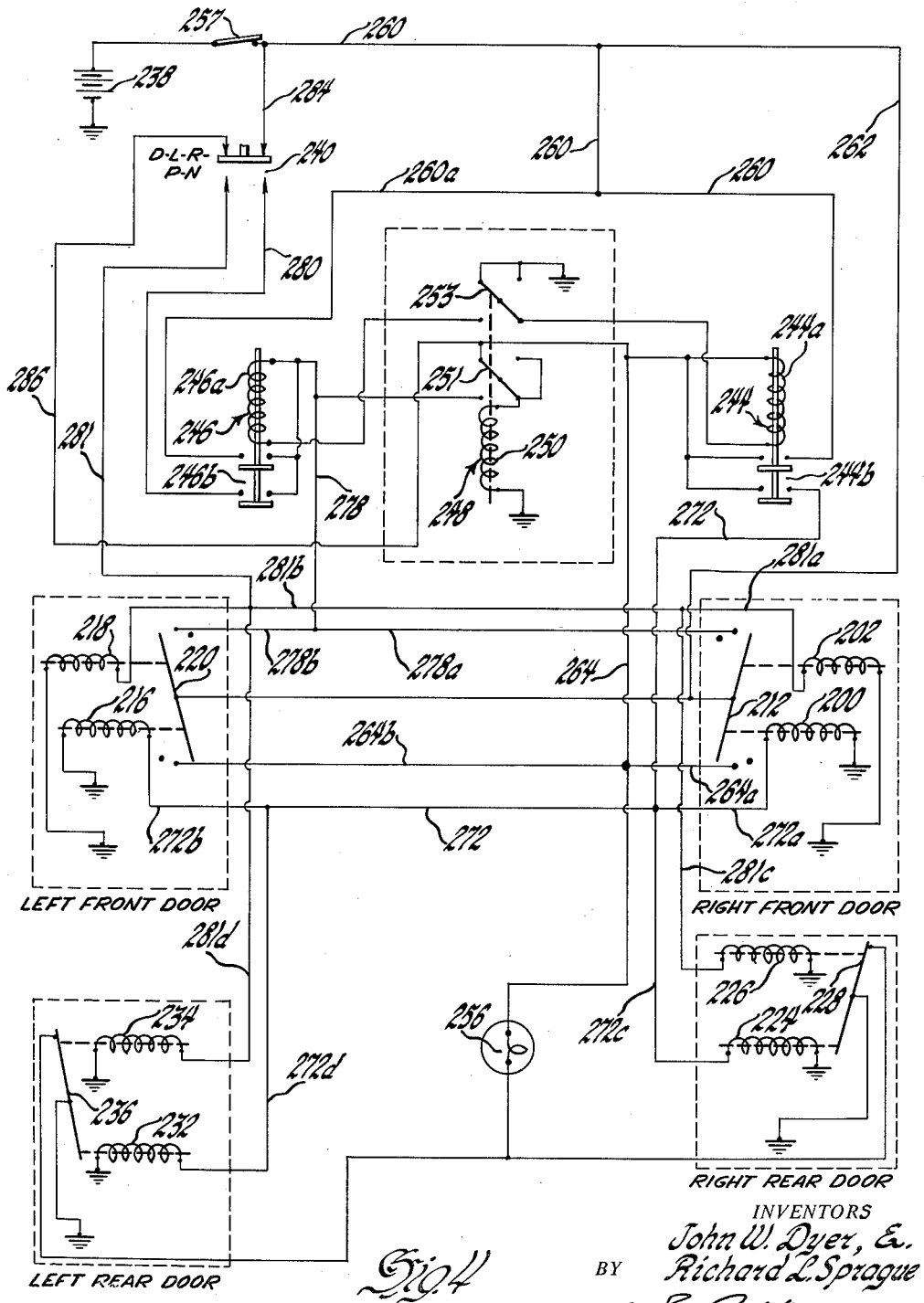

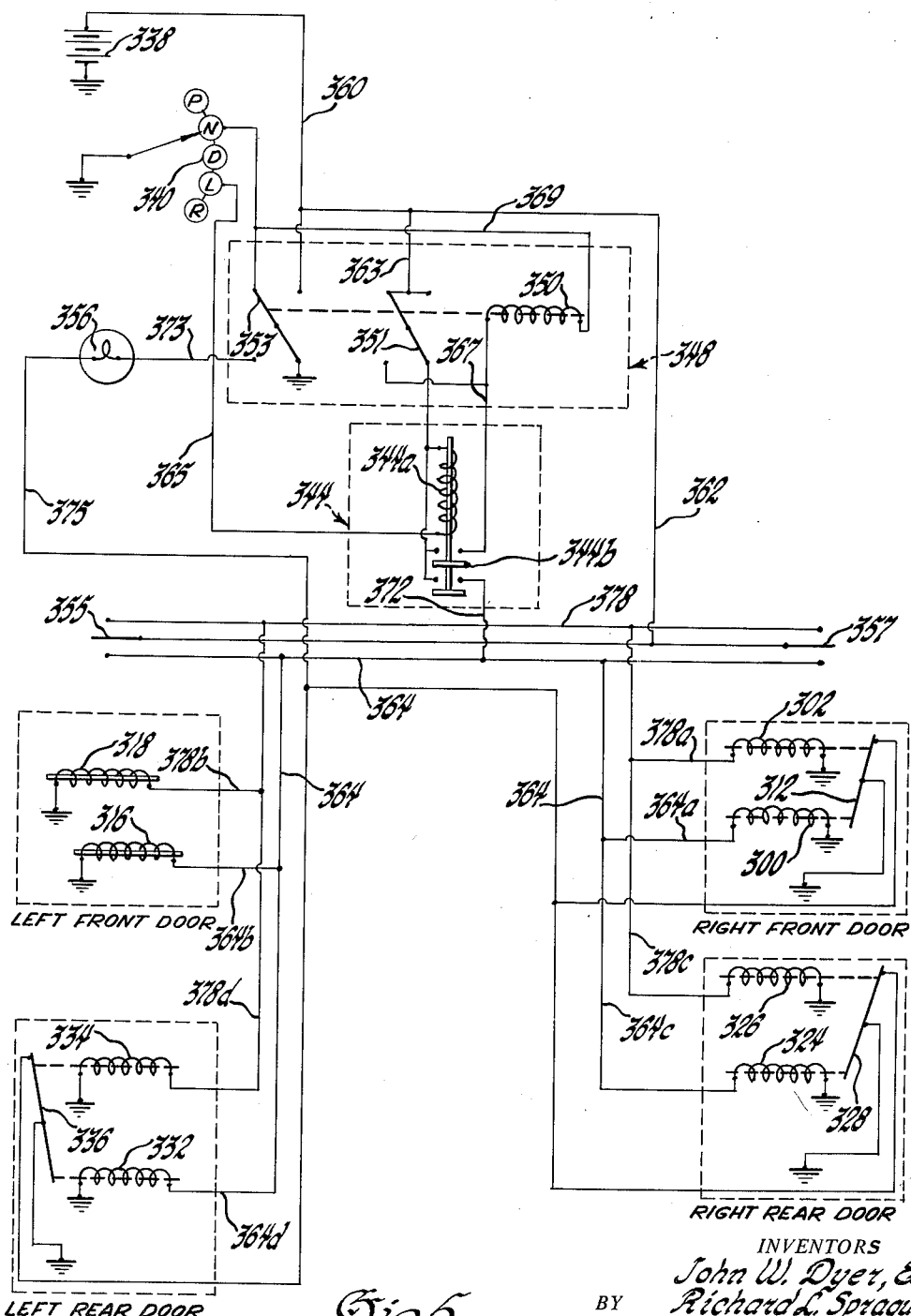

3,030,794
COINCIDENTAL DOOR LOCKING APPARATUS FOR AN AUTOMOBILE

John W. Dyer, Pendleton, and Richard L. Sprague, Anderson, Ind., assignors to General Motors Corporation, Detroit, Mich., a corporation of Delaware
Filed Sept. 25, 1959, Ser. No. 842,323
17 Claims. (Cl. 70—264)

This invention relates to vehicle door locking means, and more particularly to coincidental door locking apparatus for an automobile.

Each door of an automobile conventionally is provided with a door latch, each of which can be independently locked manually from inside the automobile, preferably by means of a garnish molding button. In addition, each front door can be locked from the outside by means of a key, and many automobiles also incorporate a keyless locking feature whereby, upon depression of the garnish molding button when the door is open and subsequent operation of the outside push button as the door is being closed, the door will be locked as the occupant leaves the vehicle.

This invention relates to improved coincidental door locking means whereby more than one door can be locked and unlocked in a single operation. An important feature of the invention is that it incorporates time delay means which operate after a predetermined lapse of time to disconnect the system from the power source to avoid the expenditure of power except during the short periods of time when coincidental locking and unlocking actually occur. This avoids an unnecessary drain on the automobile battery and in addition leaves the system under manual control so that any door can be manually locked or unlocked at any time desired. In the event of power failure, the system is under manual control as in conventional automobile door lock arrangements. In preferred forms of the invention there are no manually operated switches other than the conventional garnish molding buttons and key locking devices and all manual operation is obtained through operation of these conventional buttons and the outside keylocks for the front doors. At the same time, automatic operation is controlled by the position of the transmission selector lever.

In our improved apparatus, all electric control originates in the front doors and the rear door coincidental units are followers only. If the electric system fails for any reason, the doors may be locked and unlocked manually as in usual automobile single door control systems. Furthermore, no modifications of any of the present lock parts and controls therefor are required.

The improved system operates through lock and unlock solenoids in each door, each of these solenoids being so located that it is relatively invulnerable to the effects of inertia during rapid acceleration and deceleration of the automobile.

Other features of the improved arrangement are that in the event one of the door lock manual control means (that is, one of the garnish molding buttons in the type of system shown in the drawings) gets in the opposite lock condition from the condition of the other doors through manual operation, it will not be moved to the other lock position upon automatic operation, but will fall into step with the rest of the system. Manual operation of either front door lock does not require as much force as is necessary to lock the door in a conventional manual system because during manual operation of either of the front door garnish molding buttons or either front door key lock, electrical contact is made so that the solenoids take over and complete the operation after the exercise of only enough manual force as is necessary to bring the parts into an intermediate position where the electrical circuit is completed. Also, our improved system is so arranged that it will not "machine gun" unless one of the front door garnish molding buttons or one of the key lock devices is manually held in an intermediate position. Even in this event the frequency is fairly slow, being in the range of .5 to 2 seconds per reversal.

Other features and advantages of the invention will be apparent from the following description and from the drawings in which:

FIG. 1 is a partial side elevational view of a four-door automobile having the improved coincidental door locking system incorporated therein, the basic components of the locking arrangement being shown inside each door in broken lines;

FIG. 2 is an isometric view, partially broken away, of the front door latch of FIG. 1, together with the operating solenoids therefor;

FIG. 3 is a diagrammatic representation of one form of the invention;

FIG. 4 is a diagrammatic representation of a second form of the invention; and

FIG. 5 is a diagrammatic representation of a third form of the invention.

Latch Structure

Referring now more particularly to the drawings, the reference character 10 designates generally an automobile having a front door 12 and a rear door 14. As is conventional, the opposite side of the automobile is provided with similar front and rear doors. Each door carries between its inner and outer panels a latch which may be similar to the latches shown and described in detail in Patent 2,871,049. In the front door this latch is designated generally as 16 and in the rear door the latch is designated generally as 18. The front door latch may be operated from outside the automobile by a push button assembly 20 slidably carried in a fixed gripping handle 22 which is mounted on the outer door panel. From the inside the door may be operated by a turn handle 24 which is connected by a rod 26 to the latch. Locking and unlocking may be accomplished from the outside by a conventional key-operated cylinder which is carried in the push button 20. From the inside the door may be locked and unlocked by a garnish molding button 28 which is connected to the latch by a rod 30.

Similarly, the rear door latch 18 may be operated from the outside by a push button assembly 32 which is slidably mounted in a fixed gripping handle 34 secured to the outer panel of the door 14. A turn handle 36 is mounted on the inner panel of the door and is connected to the latch by a rod 38 for operation of the latch from inside the automobile. In the rear door there is usually no outside key-operated lock and the only means for locking the door is a conventional garnish molding button 40 which is connected by a rod 42 to the door latch 18.

FIGURE 2 shows the front door latch in perspective. The latch comprises a frame designated generally as 44 and having a base portion 46 which, when the latch is mounted in the door, lies closely adjacent and parallel to the jamb of the door. A right angle flange portion 48 of the frame lies adjacent and parallel to the inner door panel and carries certain of the latch operating parts.

The latch includes a rotary bolt 50 formed generally as a gear and adapted to cooperate with complementary teeth in a striker which is mounted on the body. The striker is not shown but it may be similar to the striker shown and described in Patent 2,871,049. The bolt 50 is fixedly mounted on a bolt shaft 52 which extends through and is rotatable in the base 46 of the frame. On the opposite surface of the frame from the bolt, there is a cam or ratchet member 54 which is also fixedly mounted on the shaft 52 so that the bolt 50, shaft 52, and ratchet 54 are effectively an integral unit.

The bolt assembly 50, 52, 54 is held against rotation in a door opening direction to retain the door in latched position with the bolt teeth in engagement with the complementary striker teeth by a detent 56 which is pivotally mounted on a stud 58 extending from the latch frame. A spring 60 is coiled about the stud 58 and has one end hooked into the detent to urge the detent into engagement with the ratchet 54, and when the detent engages the ratchet as shown in FIGURE 2, the bolt assembly is held against rotation in a counterclockwise direction so that the door is latched and cannot be opened. Since the ratchet teeth each has a sloping back side, the detent is cammed out of the way when the door is being closed and the bolt rolls over the striker teeth in a door closing direction.

Means for operating the detent from outside the automobile comprises a detent release lever 62 which is pivotally mounted at 64 on the latch frame and which is urged toward a normal retracted position by the other end of the spring 60 which is hooked over the end of the release lever. At its free end, the release lever has a flange 62a bent therefrom at right angles for engagement by the push button 20 so that upon operation of the push button from outside the automobile, the release lever is swung in a clockwise direction as the parts appear in FIG. 2. An intermittent link 66 is pivotally mounted at 68 on the release lever 62 and has an arm 66a which is adapted to engage one arm 70a of a multi-armed multiplier lever 70 which is pivoted on the latch frame at 72. Another arm 70b of the multiplier lever is connected to the detent so that when the push button 20 is pushed in, the multiplier lever is picked up by the intermittent link 66 and moved in a clockwise direction to swing the detent 56 in a counterclockwise direction out of engagement with the ratchet 54 to permit free rotation of the bolt assembly in a door opening direction. The door may now be pulled open, the bolt teeth riding over the complementary teeth of the striker.

For inside operation, there is a remote lever 74 pivotally mounted at 76 on the flange portion 48 of the frame. This lever is connected to the rod 26 which, as shown in FIG. 1, is connected at its other end to the turn handle 24. Operation of the turn handle will pull on the rod 26 to swing the remote lever 74 in a counterclockwise direction so that a finger 74a on this lever which overlies a third arm 70c of the multiplier lever 70 will pick up the multiplier lever and swing the detent out of engagement with the ratchet 54.

The door latch illustrated is adapted to be locked against outside operation by uncoupling the intermittent link 66 from the multiplier lever 70 so that upon operation of the push button 20, the intermittent link merely "free wheels" and does not move the multiplier lever 70 or the detent 56. Even though the door is locked against outside operation it is never locked against inside operation since the remote lever 74 is always coupled to the multiplier lever 70.

In order to lock the door from the outside, there is a rock lever 78 which is pivotally mounted at 80 on the latch frame and which terminates at its outer end in a flange 78a which is received in the bifurcated end of a member 82 which is connected to and moved by the key cylinder in conventional and well known manner. When a proper key is inserted into the key cylinder and turned, the member 82 is moved to swing the rock lever 78 about its pivot 80. A link 84 is connected to the inner end of the rock lever 78 and extends upwardly where it is connected to a shiftable locking member 86 which is pivotally mounted at 88 on the flange portion 48 of the latch frame. The locking member 86 has bifurcated arms 86a and 86b which receive between them a flange bent from the end of a second arm 66b of the intermittent link 66. When the key is turned the rock lever 78 is swung to pull down on the link 84 and swing the locking member 86 in a counterclockwise direction. The bifurcated arms pick up the intermittent link and swing it downwardly so that its coupling arms 66a is out of the way of the multiplier lever, and when the push button 20 is operated the itnermittent link merely free wheels and does not pick up the multiplier lever. An overcenter spring 90 yieldably holds the locking member 86 in either locked or unlocked position.

Locking from the inside is accomplished through the garnish molding button 28 which is connected to the locking member 86 through the rod 30 and through a lever 92 which is pivoted on the flange 48 of the latch frame and is coupled by a tab 92a to the locking member 86. Depression of the garnish molding button 28 pushes down on the rod 30 and swings the lever 92 in a clockwise direction. This in turn picks up the locking member 86 and swings it in a counterclockwise direction to swing the intermittent link down out of coupling engagement with the multiplier lever and lock the door.

As explained more fully in Patent 2,871,049, the latch shown in FIGURE 2 has an undogging feature whereby, if the garnish molding button 28 is depressed to place the latch parts in locked position while the door is open and the door is then closed, the latch parts will be returned to their unlocked position so that the operator of the automobile will not inadvertently lock himself out of the car should he leave the keys in the ignition. On the other hand the latch is so arranged that if desired the door can be locked without a key upon the performance of a conscious act by the operator. The undogging function is accomplished by interengagement of an abutment 66c on the intermittent link 66 with a complementary abutment 56a on the detent. When the latch parts are in locked position, the intermittent link 66 is swung clockwise from the position shown in FIGURE 2 so that the abutment 66c lies closely adjacent the detent abutment 56a. When the door is closed with the parts in this position, the detent is cammed over the sloping back side of one or more of the ratchet teeth, pivoting the detent in a counterclockwise direction so that the detent abutment 56a picks up the intermittent link abutment 66c and swings the intermittent link 66 counterclockwise past a point where the overcenter spring 90 takes over and completes the movement of the parts back to unlocked position. On the other hand, should the operator consciously desire to lock the door without the use of a key, he merely pushes down on the garnish molding button 28 when the door is open and while the door is being closed he pushes in on the push button 20. This latter operation shifts the release lever 62 and the intermittent link 66 to the right in FIG. 2 so that the intermittent link abutment 66c is out of the path of movement of the detent abutment 56a. When the door is closed with the parts in this position, there is no undogging action to shift the latch parts back to unlocked position.

In order to accomplish the coincidental locking which is the subject of this invention, there is a locking solenoid 100 and an unlocking solenoid 102 connected through a lever arrangement to the lever 92. A rod 104 extends from lever 92 to a rock lever 106 which is pivotally mounted at 108 on a bracket in the door. The rock lever 106 is connected on one side of its pivot to the armature 102a of the solenoid 102 and is connected on the other side of its pivot 108 to the armature 100a of the solenoid 100. The lever 106 carries a link 110 which is connected to the operating member of a switch 112.

The connection between the respective solenoid armatures 100a and 102a and the lever 106 is made by means of an open-ended slot in each of the armatures into which an end of the rock lever 106 is loosely received. Vinyl tubing as shown at 106a is mounted on each end of the lever to reduce the noise of impact. As shown in FIG. 2, the solenoids are mounted with the plungers hanging down to reduce the possibility that dirt and moisture will jam the moving parts. Since the latch parts are aided in movement between locked and unlocked positions by the overcenter spring 90, the solenoids 100 and 102 are so located and arranged that their plungers carry the lever 106 just past a center position. The door locking parts complete their travel under the influence of the overcenter spring 90.

Solenoid 100 is the locking solenoid and upon energization of the solenoid, its armature 100a is moved downwardly to swing the link 106 in a counterclockwise direction, moving the rod 104 downwardly and swinging the lever 92 in a clockwise direction and the locking member 86 in a counterclockwise direction to place the latch parts in locked position. Conversely, when the unlocking solenoid 102 is energized, its armature 102a moves downwardly, swinging the rock lever 106 in a clockwise direction and moving the latch parts to unlocked position. Movement of the lever 106 in either direction moves the operating member of the switch 112 by means of the link 10.

Coincidental Locking—FIG. 3

Referring now to the diagrammatic representation of FIG. 3, the right front door 12 of the automobile is indicated in broken lines together with the locking solenoid 100, the unlocking solenoid 102 and the switch 112. The left front door of the automobile is indicated diagrammatically at 15 and this door carries a locking solenoid 116 and unlocking solenoid 118 and a switch 120, these elements being similar to corresponding elements in the right front door. The switches 112 and 120 are open at both extremities of movement of the switch armature. During movement of the switch armature in either direction from one extreme position to the other, each pole of the armature makes brief contact with its respective switch contact. The right rear door which is indicated diagrammatically at 122 carries a locking solenoid 124 and unlocking solenoid 126 and a single pole single throw switch 128 which is operated between open and closed positions by the solenoids 124 and 126. Similarly, the left rear door 130 carries a locking solenoid 132 and unlocking solenoid 134 and a single pole single throw switch 136 which is operated between open and closed positions by the two solenoids.

The other elements of the coincidental locking system include a battery 138 which may be a conventional twelve-volt automobile battery. A switch 140 is operated by the transmission selector lever and may be similar to the switch shown in the copending application of Daniel M. Adams, et al., Serial No. 648,209, entitled, "Automobile Door Latching System," and assigned to the assignee of this application. The switch 140 is a double pole double throw switch which has one closed position when the transmission selector lever is in any drive position, as for example in drive, low, or reverse in a conventional automatic transmission, and the switch has another closed position when the transmission selector lever is in a non-drive position, as for example, park or neutral in a conventional automatic transmission.

A control unit indicated diagrammatically at 142 may house electrical components comprising a locking power relay designated generally as 144, an unlocking power relay designated generally as 146, and a delay arrangement designated generally as 148 and including delay relay coils 150 and 152 and a snap-type reversing switch 154 having its movable pole carried by an armature which is common to the coils 150 and 152. The delay relay coils are of conventional commercially obtainable type and are designed to provide a delay in operation of from .5 to 2 seconds after their energization. In addition, there is a warning device which is illustrated as a lamp 156. If desired a buzzer or other audible device may be substituted for the visual warning device shown.

Manual Coincidental Operation

Locking operation will first be described with the transmission selector lever in park or neutral position—i.e. with the switch 140 in the position other than that illustrated in FIGURE 3. One side of the battery 138 is connected to ground as is conventional. The other side is connected to a lead 160 which extends to a contact of the locking relay 144. A branch lead 160a extends in parallel to a contact of the unlocking power relay 146. If either of the front door garnish molding buttons, as button 28 of FIG. 1, is pushed down manually, or if one of the front doors is locked by means of a key, one of the switches 112 or 120 will be moved so that the switch armature brushes by and momentarily closes both of the switch contacts. Assume that the button 28 is pushed down so that the switch 112 is manually moved to the position other than that shown in the drawings. This will energize the coil 144a of the locking power relay 144 through a circuit including a lead 162 which branches from the lead 160 and extends to the center contact of each of the switches 112 and 120. The lower contact of the switch 112 is connected by a lead 164 to the upper end of the coil 144a and the lower end of the coil is connected by a lead 166 to one terminal of the snap over delay relay switch 154, the armature of which is connected to ground. It should be noted that the delay relay coil 150 is connected in parallel with the locking power relay coil 144a by means of leads 164 and 166, so that the coil 150 is energized simultaneously with the power relay coil 144a. However, there is a delay of .5 to 2 seconds before operation of the delay relay. The unlocking power relay coil 146a is not energized at this time because, even though the upper contact of switch 112 is momentarily closed, there is no ground return for the unlocking power relay coil or for the delay relay coil 152 which is connected in parallel therewith, since the delay armature switch 154 is in the position shown in FIGURE 3.

When the armature of the relay 144 closes the normally open relay contacts 144b, a circuit is closed from the battery through lead 160 and through a lead 172 to the locking solenoids 100, 116, 124, and 132, lead 172 having parallel branches 172a, 172b, 172c, and 172d which lead to the respective locking solenoids. Now all four of the locking solenoids 100, 116, 124, and 132 are energized so that all doors of the automobile are locked and front door switches 112 and 120 are in the reverse position from that shown in the drawing. The relay coil 144a is now self-holding regardless of the position of either of the switches 112 or 120 as long as the delay armature switch is in the position shown in FIGURE 3. The holding circuit comprises a lead 173 which is connected between relay contacts 144b and coil 144a and coil 144a is grounded through the delay relay switch 154. These switches are not closed but are open at both extremities of travel, as pointed out above. In the rear doors the single pole single throw switches 128 and 136 are now open so that there is an open circuit to the warning lamp 156. The warning lamp is connected to the lead 164 by a lead 174 and the other side of the lamp is connected to a lead 176 of which one branch 176a extends to the switch 128 and another branch 176b extends to the switch 136.

The delay relay coil is connected in parallel with the locking power relay coil 144a through leads 164 and 166 so that the delay coil 150 was energized simultaneously with the energization of relay 144. After a predetermined delay time which preferably may range from .5 seconds to 2 seconds, the delay relay operates, causing the control switch 154 to move to the position other than that shown in FIGURE 3 and breaking the ground connection to relay coils 144a and 150. This action cuts off all energization to the system and the doors remain locked. When locking power relay 144 is deenergized its contacts open so that the locking relays 100, 116, 124, and 132 are deenergized.

In order to unlock the doors coincidentally with the transmission selector lever in park or neutral, i.e., the position other than that shown in FIGURE 3, the garnish molding button on either of the front doors is pulled up. This operation will, as shown in FIGURE 2, swing the lever 106 and link 110 so that one of the switches 112 or 120 (depending upon whether the right front door or left front door is operated) will move back to the position shown in FIGURE 3, and during the course of its movement, it will momentarily close its switch contacts. This completes a circuit to the unlocking relay coil 146a from the battery 138 through the lead 160, the lead 162, one of the switches 112 or 120, and a lead 178 which has branches 178a and 178b connecting respectively with the switches 112 and 120. The lead 178 is connected to the coil 146a of the unlocking power relay 146 so that this relay is energized, the coil returning to ground through the switch 154 which, after completion of the locking cycle, is in the position other than that illustrated in FIGURE 3.

As one of the switches 112 or 120 momentarily closes, the lead 164 is also energized but there is no ground connection to complete the circuit through the locking power relay coil 144a. When the relay coil 146 is energized, its contacts close and the upper set of contacts as illustrated in the drawing become holding contacts, being connected to the battery through the leads 160 and 160a and being connected to the coil 146a through a lead 179, so that the relay is self-holding so long as the switch 154 remains in the position other than that illustrated in FIGURE 3. Delay relay coil 152 is energized simultaneously with the energization of unlocking power relay coil 146a. The lower set of contacts of relay 146 complete a circuit to energize all of the unlocking relay coils 102, 118, 126, and 134. This circuit extends from the battery through leads 160 and 160a and the upper and lower contacts of relay 146, then through lead 180 to switch 140, the lower contacts of which are shorted, through lead 182 and its branches 182a, 182b, 182c, and 182d to the respective unlocking coils in the automobile door. After a predetermined time delay the delay relay coil 152 operates to reverse the switch 154 back to the position illustrated in FIGURE 3, breaking the ground connection to the relay coils 146a and 152. The contacts of relay 146 open and the circuit to the door unlocking solenoids 102, 118, 126, and 134 is broken. In the rear doors switches 128 and 136 are returned to the closed position shown in FIGURE 3, but the lamp 156 is not energized because the contacts 144b of the locking relay coil 144 are open.

*Automatic Coincidental Operation*

In the sequence of locking and unlocking described above it was assumed that the transmission selector lever was in park or neutral position and the coincidental locking operation was initiated by manual movement of one of the garnish molding locking buttons in one of the front doors or by locking one of the front doors with a key. The system shown in FIGURE 3 is so arranged that if the transmission selector lever is in drive, low, or reverse position, so that the shorting bar of the switch 140 is in the position illustrated in FIGURE 3, automatic locking occurs.

One contact of the upper set of contacts in the switch 140 is connected by a lead 184 to the lead 160 and thence to the battery 138. The other one of the upper set of switch contacts 140 is connected by a lead 186 to the lead 164 so that, with the switches 140 and 154 in the position shown, the relay coils 144a and 150 are energized and the locking sequence described above occurs automatically without the necessity of initiating the locking cycle through movement of a front door garnish molding locking button to locked position. If a front door garnish molding button is raised to its unlocked position while the switch 140 is in the drive position as illustrated, the unlocking power relay 146 and the unlocking delay relay 152 are energized but the unlocking solenoids 102, 118, 126, and 134 are not energized since the circuit to these unlocking solenoids goes through the lower contacts of switch 140 and these lower contacts are open. After the predetermined time delay inherent in the operation of delay relay 152 has occurred, the relay 152 shifts switch 154 back to the position illustrated in FIGURE 3 so that the locking sequence as described above is initiated and the door which was manually unlocked again becomes locked.

The description in the paragraph above applies of course only to one of the front door garnish molding buttons. If a rear door garnish molding locking button is raised to unlock that door while the transmission selector lever is in a drive position so that switch 140 is in the position shown in FIGURE 3, one of the switches 128 or 136 which is located in that door will be closed, completing a circuit through the warning lamp 156 to give the driver of the car an indication that a rear door is unlocked. In order to relock the door it is merely necessary to raise a front door garnish molding button sufficiently to complete closure of one of the front door switches 112 or 120 to initiate the cycle described in the preceding paragraph.

From the above description of the construction and operation of the coincidental locking system shown in FIGURES 1, 2, and 3, it will be seen that there are no manually operated switches additional to the switches found in automobiles having only conventional single door control because manual operation of this system is controlled by means of the conventional garnish molding button and outside key lock. All electric control is centered in the front doors and the rear door units are followers only. Furthermore, if the electric system loses its power for any reason, the doors may be locked and unlocked manually and no jamming of the doors in locked position can occur. Furthermore, from the above description it will be seen that no door can get out of phase with the system and in the event any door is locked or unlocked manually when the system is in the other phase, upon operation of the electrical system that door will fall into step.

*Coincidental Locking—FIG. 4*

FIGURE 4 shows a modification of the invention which is basically similar to the embodiment of FIGURE 3 with the exception of the control device. Also, in FIGURE 4 the coincidental locking means is shown connected to the battery through the ignition switch so that the doors will not be automatically locked in the event the driver leaves the transmission selector lever in a drive range while the car is parked.

In FIGURE 4 there are door locking solenoids 200, 216, 224, and 232, one located in each door and connected to the door lock therein in the manner shown in FIG. 2. Similarly there are four unlocking solenoids 202, 218, 226, and 234, one being located in each door and being connected to the latch in the door in the manner shown in FIGURE 2.

In the right front door there is a rotary type double pole switch 212 which is similar to the switch 112 in the embodiment of FIGURE 3. This switch is connected to and operated by the solenoids 200 and 202 in the same manner as is the switch 112 in FIGURE 2. As in the previously described embodiment of the invention, switch 202 is open at both ends of its travel and is closed momentarily as it moves from one terminal position to the other. A similar switch 220 is in the left front door, and the rear doors each carry a single pole single throw switch 228 and 236 respectively, these switches being similar and corresponding to switches 128 and 136 in FIGURE 3. The other components of the system shown in FIGURE 4 include a battery 238 which may be the usual automobile battery and a transmission selector lever control switch 240. An unlocking power relay is designated generally as 246 and comprises a coil 246a and two sets of normally open contacts 246b. A locking power relay designated generally as 244 includes a coil 244a and two sets of normally open switch contacts 244b. A delay relay arrangement 248 includes a relay coil 250 and two switches 251 and 253. As in the system of FIGURE 3 there is a warning device here illustrated as a lamp 256 which is connected to the unlocking relay to provide an indication to the operator of the automobile that a door is unlocked. In FIG. 4 the coincidental locking means is connected to the battery 238 through the ignition switch 257. If the driver leaves the car in gear, but turns off the ignition and leaves the car, the door through which the driver leaves the car will not lock behind him.

The delay relay switches 251 and 253 are similar to conventionally used headlight foot dimmer switches. These switches are operated by the armature of the coil 250 which has an inherent delay between energization of the coil and operation of the relay. As in the embodiment of the invention previously described, the delay is preferably in the range from .5 to 2 seconds.

With the transmission selector control switch in the park or neutral position, which is the position other than that shown in FIGURE 4, the system may be operated through either front door garnish molding locking button or through either front door key lock. When a front door garnish molding locking button is depressed or when the key lock in one of the front doors is operated to lock the door, the switch 212 in the right front door or the switch 220 in the left front door, depending upon which front door is being locked, is moved to its terminal position other than the terminal position illustrated in the drawing and during such movement the switch is momentarily closed. This completes a circuit to the power locking relay 244 from the battery 238 through the ignition switch 257 and leads 260 and 262 to the center terminal of the switch 212 or 220 which is momentarily closed, and from the lower contact of this switch through either branch lead 264a or 264b and lead 264 to the power relay coil 244a. The other side of this coil is grounded through the delay relay switch 253.

When the power locking relay 244 becomes energized, its two sets of switch contacts 244b close. This completes a holding circuit through the lead 260 which is connected to the top set of switch contacts, these contacts being in turn connected to the relay coil 244a. The lower set of contacts are connected to the lead 272 and through it branch leads 272a, 272b, and 272c and 272d to the locking solenoids 200, 216, 224, and 232 in the respective automobile doors so that the doors are all locked. Since the delay relay coil 250 is connected in parallel with the locking power relay coil 244a through the switch 251, the coil 250 was energized simultaneously with the coil 244. After a predetermined delay, as from .5 seconds to 2 seconds, the delay relay operates, reversing the position of the two switches 251 and 253. This breaks the ground connection to the relay 244 and breaks the energizing circuit of the relay 250 so that the system is at rest.

Raising one of the front door garnish molding buttons or rotating a key in one of the front door locks to unlock a front door operates one of the switches 212 or 220 back to the position shown in FIGURE 4 and during movement of the switch it is momentarily closed so that a circuit is completed from the battery and through leads 260 and 262 to the switch 212 or 220. From the switch the circuit extends through lead 278 and one of its branches 278a or 278b to the unlocking relay coil 246a, the other side of which is now connected to ground through the switch 253 which is in the position other than that shown in FIG. 4. Closure of the upper set of contacts 246b of the relay 246 completes a holding circuit through lead 260a so that the relay coil 246a remains energized.

The lower set of contacts of the contacts 246b of the unlocking power relay closes a circuit which energizes the unlocking solenoids 202, 218, 226, and 234 in the automobile doors. This circuit extends from the battery 238 through the leads 260 and 260a to the switch contacts 246b. The lower set of switch contacts 246b are connected by a lead 280 to the park-neutral set of contacts of the switch 240. When the transmission selector lever is in park or neutral position, these contacts are closed so that a lead 281 which is connected to them energizes all of the unlocking solenoids in the door, the lead 281 having brances 281a, 281b, 281c, and 281d which are connected respectively to the individual unlocking solenoids. After the predetermined delay, the relay 250 operates, moving switches 251 and 253 back to the position illustrated. This breaks the ground circuit of the relay coil 246a and breaks the energizing circuit of the relay coil 250 so that the system is at rest.

If the switch 240 is placed in drive, low or reverse position as illustrated in FIGURE 4, automatic locking occurs. With the switch in this position the power locking relay is energized through a lead 284 which extends through switch 240 from the battery via the lead 260. The switch 240 is also connected to the power locking relay coil 244a through a lead 286 so that the relay coil is energized and simultaneously the coil 250 of the delay relay is energized. Energization of these two relays causes automatic locking of the doors in the manner described in connection with the manual operation of the system.

If a front door sill button is raised while the switch 240 is in the position illustrated, closure of one of the switches 212 or 220 energizes the unlocking power relay in the manner above described. However, the connection to the unlocking solenoids in the doors is broken by the switch 240 and the doors will not become unlocked. After the predetermined delay the delay relay 250 operates and the automatic locking sequence occurs as described above so that the door which was manually unlocked is again locked. Similarly, as in the embodiment of the invention illustrated in FIGURE 3, if a rear door is manually unlocked by raising the garnish molding button, it may be locked by raising a front door garnish molding button or turning the front door key a sufficient amount to move one of the switches 212 or 220 to its closed position.

The coincidental door locking system shown in FIGURE 4 has all of the advantages of the system shown in FIGURE 3 plus an advantage in ease and simplicity of manufacture and assembly. In the apparatus of FIGURE 3 the delay system includes two relay coils and a switch operated by both. These coils and the switch must be properly located in relation to each other. Furthermore since there are two coils, there may be a difference in the delay time in the locking and unlocking operations. The control or delay arrangement of FIGURE 4 is less complicated to manufacture than is the arrangement in FIGURE 3 and requires no critical internal adjustments since there is only one coil. Also, inasmuch as a conventional type of headlight dimmer switch may be used, devices are readily available wherein the switches are constructed for proper operation by the delay relay coil.

*Coincidental Locking—FIGURE 5*

FIGURE 5 shows a third form of the invention which differs from the two forms described above in that when the transmission selector lever is in park or neutral position the coincidental locking arrangement is manually controlled by switches separate from the garnish molding buttons and key locks.

The right front door mounts a locking solenoid 300 and an unlocking solenoid 302. These solenoids mechanically operate a single pole single throw switch 312 which is similar to the switches mounted in the rear doors of the other two embodiments of the invention. The left front door, which is the driver's door is similar in carrying a locking solenoid 316 and an unlocking solenoid 318. In the circuit as illustrated there is no switch and no warning signal is provided in the event the driver's door is unlocked. If desired such switch could be mounted in the door to be operated by the solenoids and to be connected in parallel with the switch 312. The right rear door has a locking solenoid 324 and an unlocking solenoid 326 which control a single pole single throw switch 328 and the left rear door has a locking solenoid 332, an unlocking solenoid 334, and a switch 336. The other circuit elements include a battery 338 which may be the usual automobile battery, a single pole double throw switch 340 which is controlled by the transmission selector lever so that the switch armature is closed with one contact when the transmission selector lever is in park or neutral position and is closed with another contact when the lever is in drive, low or reverse position. A control unit includes a delay apparatus designated generally as 348 and including a delay relay coil 350 and two switches 351 and 353, the delay apparatus being similar to that shown and described in connection with FIG. 4. There is a warning lamp 356 for the purpose of indicating when a door is unlocked if the transmission selector lever is in a drive position and there is a power relay designated generally as 344 and comprising a coil 344a and two relay switches 344b.

When the transmission selector lever controlled switch 340 is in the park-neutral position shown, the operation is manual. For this purpose there are two manually controlled single pole double throw switches 355 and 357 which are mounted on the automobile dashboard, each convenient to one of the front doors. These switches are spring biased into a normal open position as shown and may be closed against either of two contacts by manual pressure. When released the switches return to open position. Closing either one of these switches 355, 357 into the locking position completes a circuit to all four locking solenoids 300, 316, 324, and 332. This circuit extends from the battery 338 through leads 360 and 362 to the movable pole of the switches 355 and 357. From the lower or locking contact of each of these switches, there extends a lead 364 having branches 364a, 364b, 364c, and 364d which are connected to the respective locking solenoids. Since each of the solenoids is grounded, the circuit is completed upon closing one of the switches 355 or 357. When the closed switch is released, it returns to neutral open position and the circuit is broken.

In order to unlock all of the doors coincidentally, one of the switches 355 or 357 is closed in the upper or unlocking direction. This completes a circuit from the battery 338 to each of the unlocking solenoids 302, 318, 326, and 334. This circuit extends from the battery through the leads 360 and 362, and through the switch 357 to a lead 378 which is connected to the unlocking terminal of both of the switches 355 and 357. The lead 378 has branch leads 378a, 378b, 378c, and 378d which are connected respectively to the unlocking solenoids. When the manual switch 355 or 357 is released, it returns to open position and the unlocking circuit is broken.

If the transmission selector lever is changed from park or neutral to a drive position, the switch 340 is shifted to the position other than that shown in FIGURE 5. Now the locking operation is automatic. The power relay 344 is energized through a circuit from the battery including leads 360, 362, and 363 to switch 351, the other side of the switch being connected to the coil and the contacts of the power relay 344. The other side of the power relay coil is connected by a lead 365 to the switch 340 where the circuit is grounded. Closure of the upper set of contacts of the relay 344 causes energization of the delay relay coil 350, these contacts being connected by a lead 367 to one side of the relay coil 350 and the other side of the coil being connected by a lead 369 to the grounded switch 353. The other set of contacts of the power relay 344 are connected by a lead 372 to the locking circuit lead 364 which in turn is connected to all of the door locking solenoids. After the predetermined delay which is inherent in the operation of the delay mechanism 348 the delay relay operates to move the rotary switches 351 and 353 to the position other than that shown in the drawing. The switch 351 breaks the energizing circuit of the coil 344a of the power relay and also the energizing circuit of the delay relay so that the system is at rest with all doors locked.

In the event that one or more of the doors is manually unlocked, coincidental relocking can only be performed through one of the manual switches 355 and 357. When the transmission selector lever controlled switch 340 is returned to the park-neutral position shown, the circuit is completed through leads 360, 362, 363, switch 351, and lead 367 to the delay relay coil 350 which is energized since it is connected to ground through the lead 369 and switch 340. After the predetermined delay the delay switches 351 and 353 are operated to return the parts to the normal locking position illustrated.

If a rear door or the right front door is unlocked while the switch 340 is in a drive position (drive, low or reverse position of the transmission selector lever) a circuit is closed through the warning lamp 356. This circuit includes battery 338, the leads 360, the switch 353, and a lead 373 which is connected between this switch and the lamp. The other end of the lamp is connected by a lead 375 to each of the grounding switches 312, 324, and 336 in parallel.

The system shown in FIGURE 5 is less complicated and consequently less costly than the systems of FIGURES 3 and 4. On the other hand the system of FIGURE 5 does not have the automatic locking and unlocking features when the transmission selector lever is in park or neutral.

While we have shown and described certain embodiments of our invention, it is capable of many modifications. Changes therefore in the construction and arrangement may be made without departing from the spirit and scope of the invention.

What is claimed is:

1. In an automobile having a source of power and having a plurality of doors, each of which has a door latch with mechanical locking means therefor, coincidental apparatus for operating said locking means in a plurality of doors simultaneously, comprising: motor means in each door connected to the locking means thereof; power relay means connected to said motor means for controlling the energization thereof; control circuit means adapted to connect said power relay means in circuit with the source of power; and time delay means connected to said power relay means, said time delay means including switch means for breaking the circuit to said power relay means at a predetermined time after energization thereof.

2. In an automobile having a battery and having a plurality of doors, each of which has a door latch with mechanical locking means therefor, coincidental apparatus for operating said locking means in a plurality of doors simultaneously, comprising: motor means in each door comprising locking and unlocking solenoids connected to the mechanical locking means of each door latch which is to be coincidentally operated; power relay means connected to said motor means for controlling the energization thereof; control circuit means adapted to connect said power relay means in circuit with the battery, said control circuit means including switch means connected to and operated by said mechanical locking means; and time delay means connected to said power relay means, said time delay means including switch means for breaking the circuit to said power relay means at a predetermined time after energization thereof.

3. In an automobile having a source of power and having a plurality of doors, each of which has a door latch with mechanical locking means therefor, coincidental apparatus for operating said locking means in a plurality of doors simultaneously, comprising: motor means in each door connected to the locking means thereof; power relay means connected to said motor means for controlling the energization thereof; control circuit means adapted to connect said power relay means in circuit with the source of power; and time delay means connected in a circuit which is generally in parallel with said power relay means, said time delay means including switch means connected in said control circuit for breaking said control circuit at a predetermined time after energization of the power relay means and the delay means.

4. Apparatus of the character claimed in claim 3, wherein said motor means comprises at least one solenoid connected to the mechanical locking means of each door latch which is to be coincidentally operated.

5. Apparatus of the character claimed in claim 3, wherein said motor means comprises a locking solenoid and an unlocking solenoid connected to the mechanical locking means of each door latch which is to be coincidentally operated.

6. Apparatus of the character claimed in claim 3, wherein said switch means included in the time delay means comprises a pair of relay coils both operative upon the same switch armature.

7. Apparatus of the character claimed in claim 3, wherein said switch means included in the time delay means comprises a single relay coil operative upon a pair of switch armatures.

8. In an automobile having a battery and having a plurality of doors, each of which has a door latch with mechanical locking means therefor, coincidental apparatus for operating said locking means in a plurality of doors simultaneously, comprising: motor means in each door comprising locking and unlocking solenoids connected to the mechanical locking means of each door latch which is to be coincidentally operated; power relay means connected to said motor means for controlling the energization thereof; control circuit means adapted to connect said power relay means in circuit with the battery; and time delay means connected in a circuit which is generally in parallel with said power relay means, said time delay means including switch means connected in said control circuit for breaking said control circuit at a predetermined time after energization of the power relay means and the delay means.

9. In an automobile having a battery and having a plurality of doors, each of which has a door latch with mechanical locking means therefor, coincidental apparatus for operating said locking means in a plurality of doors simultaneously, comprising: motor means in each door connected to the locking means thereof; power relay means connected to said motor means for controlling the energization thereof; control circuit means adapted to connect said power relay means in circuit with the battery; time delay relay means connected in a circuit which is generally in parallel with said power relay means, said time delay means including switch means connected in said control circuit for breaking said control circuit at a predetermined time after energization of the power relay means and the delay relay means; and door switch means operated by said motor means and connected in said control circuit for controlling the energization of said power relay means and said delay relay means.

10. Apparatus of the character claimed in claim 9, wherein said door switch means comprises a double pole, double throw switch which is open at each terminal position of the switch armature and which closes momentarily as the switch armature moves from one terminal position to the other.

11. Apparatus of the character claimed in claim 9, wherein said motor means comprises a locking solenoid and an unlocking solenoid, each connected to the mechanical locking means of each door latch which is to be coincidentally operated.

12. In an automobile having a battery and having a plurality of doors, each of which has a door latch with mechanical locking means therefor, coincidental apparatus for operating said locking means in a plurality of doors simultaneously, comprising: motor means in each door connected to the locking means thereof; locking power relay means connected to said motor means for controlling the energization thereof to lock the doors; unlocking power relay means connected to said motor means for controlling the energization thereof to unlock the doors; control circuit means adapted alternatively to connect said locking power relay means and said unlocking power relay means in circuit with the battery; and time delay means connected in a circuit which is generally in parallel with each of said power relay means, said time delay means including switch means connected in said control circuit for breaking said control circuit at a predetermined time after energization of the power relay means and the delay means.

13. Apparatus of the character claimed in claim 12, wherein said switch means included in the time delay means comprises a pair of relay coils, both operative upon the same switch armature, one of said relay coils being connected generally in parallel with said locking power relay means and the other of said relay coils being connected generally in parallel with said unlocking power relay means.

14. Apparatus of the character claimed in claim 12, wherein said switch means included in the time delay means comprises a single relay coil adapted alternatively to be connected to each of said power relay means, said coil being operative upon a pair of switch armatures.

15. Apparatus of the character claimed in claim 12, including manually operable switch means connected in said control circuit for controlling the energization of said locking power relay means and said delay means.

16. In an automobile having a battery and having a plurality of doors, each of which has a door latch with mechanical locking means therefor, coincidental apparatus for operating said locking means in a plurality of doors simultaneously, comprising: motor means in each door comprising a locking solenoid and an unlocking solenoid, each connected to the locking means thereof; locking power relay means connected to said motor means for controlling the energization thereof to lock the doors; unlocking power relay means connected to said motor means for controlling the energization thereof to unlock the doors; control circuit means adapted to connect said power relay means in circuit with the battery; time delay means connected in a circuit which is generally in parallel with said power relay means, said time delay relay means including switch means connected in said control circuit for breaking said control circuit at a predetermined time after energization of the power relay means and the delay relay means; and door switch means operated by said motor means and connected in said control circuit for controlling the energization of said power relay means and said delay relay means.

17. In an automobile having a battery and having a plurality of doors, each of which has a door latch with mechanical locking means therefor, coincidental apparatus for operating said locking means in a plurality of doors simultaneously, comprising: motor means in each door comprising a locking solenoid and an unlocking solenoid, each connected to the locking means thereof; locking power relay means connected to said locking solenoids for controlling the energization thereof to lock the doors; unlocking power relay means connected to said unlocking solenoids for controlling the energization thereof to unlock the doors; control circuit means adapted selectively to connect said locking and unlocking power relay means in circuit with the battery; time delay relay means connected in a circuit which is generally in parallel with said power relay means, said time delay relay means including switch means connected in said control circuit for breaking said control circuit at a predetermined time after energization of the power relay means and the delay relay means; and door switch means operated by said motor means and connected in said control circuit for controlling the energization of said power relay means and said delay relay means, said door switch means comprising a double pole, double throw switch which is open at each terminal position of the switch armature and which closes momentarily as the switch armature moves from one terminal position to the other.

References Cited in the file of this patent

UNITED STATES PATENTS

| | | |
|---|---|---|
| 2,539,206 | Robinson | Jan. 23, 1951 |
| 2,766,406 | Schwarzkopf | Oct. 9, 1956 |
| 2,799,154 | Beal | July 16, 1957 |
| 2,842,953 | Troudt | July 15, 1958 |
| 2,852,927 | McCurdy | Sept. 23, 1958 |
| 2,934,930 | Garvey | May 3, 1960 |

UNITED STATES PATENT OFFICE
CERTIFICATE OF CORRECTION

Patent No. 3,030,794             April 24, 1962

John W. Dyer et al.

It is hereby certified that error appears in the above numbered patent requiring correction and that the said Letters Patent should read as corrected below.

Column 1, line 63, for "position" read -- condition --; column 2, line 65, after "jamb" insert -- face --; column 5, line 30, for "10" read -- 110 --; column 10, line 15, for "brances" read -- branches --; column 14, line 35, for "alternatively" read -- alternately --; same column, line 55, before "means" insert -- relay --.

Signed and sealed this 28th day of August 1962.

(SEAL)
Attest:

ESTON G. JOHNSON
Attesting Officer

DAVID L. LADD
Commissioner of Patents